(12) United States Patent
Li

(10) Patent No.: US 8,050,706 B2
(45) Date of Patent: Nov. 1, 2011

(54) TERMINAL AND METHOD FOR CONTROLLING ITS AUDIO ALARM

(75) Inventor: Zhongqing Li, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 887 days.

(21) Appl. No.: 11/966,680

(22) Filed: Dec. 28, 2007

(65) Prior Publication Data

US 2008/0214246 A1    Sep. 4, 2008

(30) Foreign Application Priority Data

Dec. 30, 2006   (CN) .......................... 2006 1 0171566

(51) Int. Cl.
*H04B 1/38*    (2006.01)
(52) U.S. Cl. ..................... 455/550.1; 455/567
(58) Field of Classification Search ............... 455/414.1, 455/421, 550.1, 566, 567, 575.1, 229, 419, 455/420
See application file for complete search history.

(56) References Cited

U.S. PATENT DOCUMENTS

| | | | | |
|---|---|---|---|---|
| 5,966,656 A | * | 10/1999 | Elkin et al. | ..................... 455/421 |
| 6,219,540 B1 | * | 4/2001 | Besharat et al. | ............... 455/421 |
| 2001/0006546 A1 | | 7/2001 | Jung | |
| 2001/0007817 A1 | | 7/2001 | Odagiri et al. | |
| 2005/0136966 A1 | * | 6/2005 | Ishii | ........................... 455/550.1 |

FOREIGN PATENT DOCUMENTS

| | | |
|---|---|---|
| CN | 1447559 A | 10/2003 |
| JP | 2001-197195 A | 7/2001 |
| JP | 2005-341187 A | 12/2005 |
| JP | 2006-536961 | 5/2006 |
| KR | 20060099990 A | 9/2006 |
| WO | WO-2007/004352 A1 | 1/2007 |

\* cited by examiner

*Primary Examiner* — Thanh Le
(74) *Attorney, Agent, or Firm* — Dickstein Shapiro LLP

(57) ABSTRACT

The present invention discloses a terminal and a method for controlling audio alarm of the terminal. The method comprises detecting whether a valid wireless signal can be received, and setting said terminal to a non-audio alarm mode when it is determined that said valid wireless signal cannot be received. With the terminal and the method of the present invention, it is possible to suppress noise pollution caused by the ringing of the terminal.

10 Claims, 2 Drawing Sheets

TERMINAL AND METHOD FOR CONTROLLING ITS AUDIO ALARM

BACKGROUND OF THE INVENTION

1. Field of Invention

The present invention relates to the field of communications, in particular to a terminal and a method for controlling the audio alarm of the terminal.

2. Description of Prior Art

The rapid advance of communications technology has endowed mobile phones (cell phones) with numerous merits, such as convenience, quickness, flexibility and limitless in terms of time and location, which gives rise to a remarkable prevalence of such mobile cells among general users and a fast growth in the number of handset users. Mobile phones, one of the symbols for the Age of Information Technology, have gradually stepped into people's daily life and work as an indispensable tool. Also, some other devices, such as personal computers and notebook computers, can be utilized to make an IP call. As an example, one in North America can use SKYPE to make a free phone all over the land of North America. Complemented with ubiquitous stationary telephone sets, these devices facilitate the communication between people to a great extent.

While the popularity of such communication products has brought to us plenty of convenience and quickness, noise pollution caused by their ringing deteriorates with unconstrained use of such communication terminals. For example, thanks to the unregulated use of these communication products, the atmosphere of silence and solemnity in various public places, such as office, conference room, classroom, library and presentation hall, is severely spoiled, leading to disturbance with the normal processes of some activities.

A variety of measures have been proposed in the prior art, with the purpose of counteracting the noise pollution caused by the ringing of communication terminals. One scheme is to dispose a dedicated device within a certain regions requiring quietness, which sets all mobile phones in this region to a silence mode by sending a control signal. Such mandatory approach, that is, switching all mobile phones to a silence mode, is hardly accepted by most users. Besides, mobile phones usually differ from one manufacture to another, and therefore, the above scheme cannot be universally implemented if some phones reject the control signal from the dedicated device.

Another scheme is that a RF (Radio Frequency) transmitter is employed to transmit a non-audio RF mechanism or control signal. Upon the reception of such non-audio mechanism or control signal, a cell phone and/or pager forbids automatically its function of audio alarm and informs its user of an incoming call with blinking light or vibration; when there is no non-audio mechanism or control signal coming again or after a constant predefined period has elapsed, the cell phone and/or pager resumes automatically its normal operation state and indicates the existence of an incoming call with the ringing of the cell or the buzzing of the pager. On the other hand, if the RF transmitter is located far enough from the cell phone and/or pager that the latter cannot receive the above non-audio mechanism or control signal, they will ring as usual.

SUMMARY OF THE INVENTION

The present invention solves the above technical problem by providing a terminal and a method for controlling audio alarm of the terminal so as to suppress noise pollution caused by the ringing of the terminal.

To achieve the object, the present invention proposes the following technical measures.

A method of controlling the audio alarm of a terminal comprises step A of detecting whether a valid wireless signal is received, and setting said terminal to a non-audio alarm mode when it is determined that said valid wireless signal is not received.

The method of the present invention further comprises the step of saving current alarm mode before said terminal is set to the non-audio alarm mode, and setting said terminal to a stored audio alarm mode when it is determined that said valid wireless signal is received.

The method of the present invention further comprises, before said step A, the step of detecting whether a ringing event occurs, and executing said step A when the occurrence of a ringing event is detected, if not, executing this detecting step.

In the method of the present invention, said ringing event is an incoming call, an information entry, timeout of a timing or a power supply alarming;

said wireless signal is a RF signal, a FM (Frequency Modulation) signal or a Bluetooth signal;

said terminal is a mobile terminal, a stationary telephone, a computer or a timer.

A terminal comprises a wireless signal detection unit and a ringing control unit, wherein said wireless signal detection unit is adapted to detect whether a valid wireless signal is received, and send a ringing-prohibition signal to said ringing control unit when it is determined that said valid wireless signal is not received;

said ringing control unit is adapted to set said terminal to a non-audio alarm mode when receiving said ringing-prohibition signal.

In the terminal of the present invention, said wireless signal detection unit is further adapted to send a ringing-recovery signal to said ringing control unit when it is determined that said valid wireless signal can be received; and said ringing control unit is further adapted to save current alarm mode before said terminal is set to the non-audio alarm mode, and set said terminal to the saved alarm mode when receiving said ringing-recovery signal.

The terminal of the present invention further comprises a ringing event detection unit adapted to detect whether a ringing event occurs, and enable said wireless signal detection unit when the occurrence of a ringing event is detected, otherwise to turn off said wireless signal detection unit when the occurrence of a ringing event is not detected.

In the terminal of the present invention, said ringing event is incoming call, information entry, timeout of certain timing or power alarming;

said wireless signal is RF signal, FM (Frequency Modulation) signal or Bluetooth signal;

said terminal is mobile terminal, stationary telephone, computer or timer.

The present invention has the following advantages compared with those in the prior art.

Noise pollution caused by the ringing of the terminal can be alleviated by detecting whether a valid wireless signal can be received and setting said terminal to a non-audio alarm mode when it is determined that said valid wireless signal cannot be received. The fact that the terminal cannot receive the valid wireless signal indicates the user is at a distance far away from the terminal. Therefore, if the terminal is not set to the non-audio alarm mode, the user may not hear the ringing of the terminal even when a ringing event does occur. As such, the audio alarm cannot take effect, and more annoying, the ringing would last for a long period or even repeat more than one time. On the other hand, if the terminal is set to the non-audio alarm mode, the noise pollution resulting from the above case can be eliminated, and the noise pollution caused by the ringing of the terminal, as a whole, can be alleviated. Furthermore, the power consumption of the terminal can be lowered by automatically set the terminal to the non-audio alarm mode.

DETAILED DESCRIPTION OF PREFERRED EMBODIMENTS

The objects, technical features and advantages of the present invention will be more apparent from the following detailed description of the invention in connection with the figures and embodiments.

The present invention basically originates from consideration to such situation that, when a user is at a certain distance from his/her terminal, he/she may not hear the ringing of the terminal and thus answer the phone timely if a ringing event in the terminal triggers the ringing, and the ringing would continue for a long time, leading to serious noise pollution. In this case, the embodiments of the present invention aim to suppress the noise pollution caused by the ringing by setting the terminal to a non-audio alarm mode.

Specifically, the user carries wireless signal transmitting means, and correspondingly, the terminal is provided with wireless signal detection means which detects whether a valid wireless signal can be received. When the wireless signal detection means cannot receive the wireless signal transmitted from the wireless signal transmitting means, or when it cannot read a correct ID number of the wireless signal transmitting means, or when the strength of the received wireless signal is lower than a specific value, it is indicated that a valid wireless signal cannot be received, and thus it is determined that the user is relatively far from the terminal and cannot hear the ringing of the terminal. At the moment, the terminal is set to the non-audio alarm mode as described above.

Figure 1:
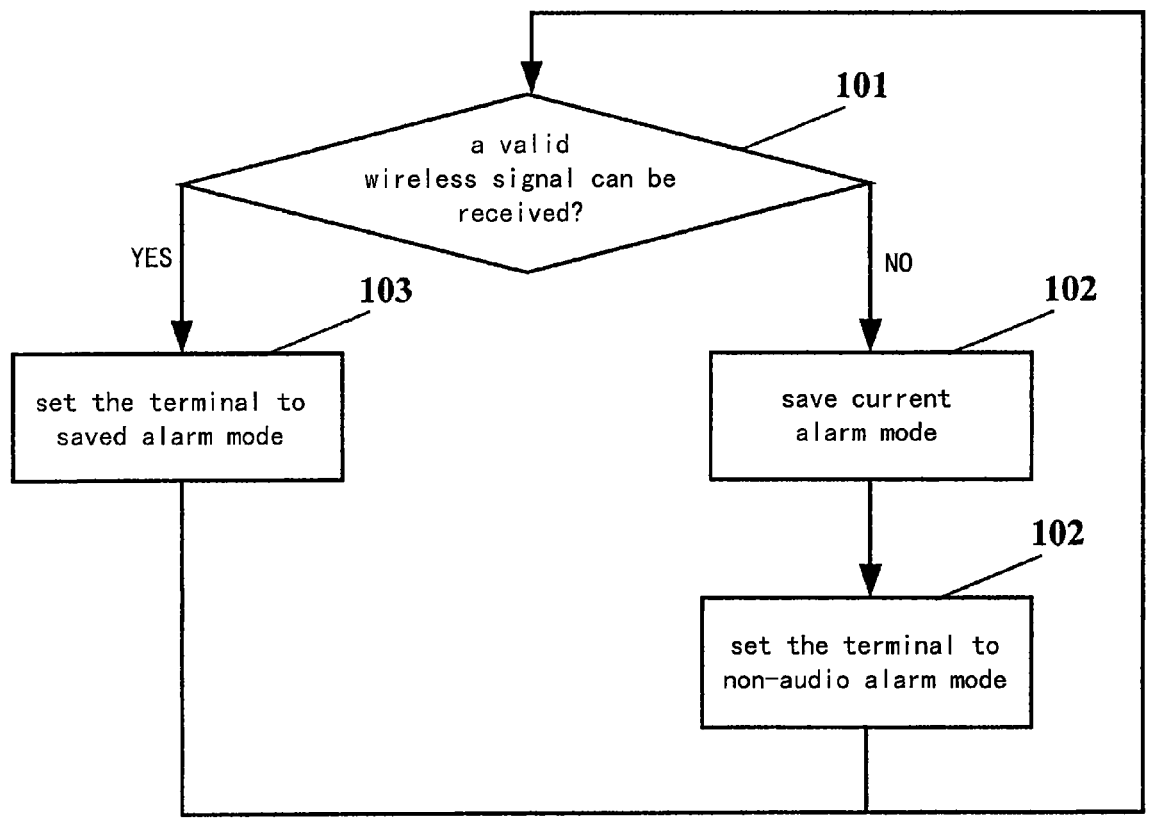
FIG. 1 is a flowchart of a method for controlling the audio alarm of a terminal according to an embodiment of the present invention.

Referring to FIG. 1, the method for controlling the audio alarm of a terminal according to the present embodiment comprises:

step 101: detecting whether a valid wireless signal can be received;

step 102: saving current alarm mode and setting the terminal to a non-audio alarm mode when it is determined that the valid wireless signal cannot be received;

step 103: setting the terminal to the saved alarm mode when it is determined that the valid wireless signal can be received.

In this method, whether a valid wireless signal can be received means that the wireless signal can be received, or it is possible to read a correct ID number of the wireless signal transmitting means, or the strength of the received wireless signal is higher than a specific value. The wireless signal can be RF, FM or Bluetooth signal, and the terminal can be mobile terminal, stationary telephone, computer or timer.

The wireless signal transmitting means is carried by the user, for example, on an earring, ring or watch worn by the user or a chip implanted into the body of the user. The wireless signal transmitting means can be RF, FM, Bluetooth means and the like. As an example, a RFID (Radio Frequency Identification) is provided on the watch worn by the user, and accordingly, the wireless signal transmitting means placed in the terminal is a RFID signal detection means. When a RFID signal can be received, or when ID number of the RFID can be correctly read, or when the strength of the received RFID signal is higher than a specific value, this detection means determines that the user is close enough to the terminal and thus sets the terminal to an audio alarm mode, in which the ringing is normally triggered upon the occurrence of any ringing event. Obviously, if the current alarm mode of the terminal is the non-audio alarm mode, the terminal can remain in the current non-audio alarm mode instead of being changed into the audio alarm mode even when it can receive a valid wireless signal. On the other hand, if the user moves away from the terminal by such a distance that a RFID signal cannot be received, or the ID number of the RFID cannot be correctly read, or the strength of the received RFID signal drops lower than the specific value, the detection means determines that the user is far away from the terminal and thus sets it to the non-audio alarm mode, such as vibration mode or silence mode, for the alleviation of noise pollution caused by the ringing. Further, the current alarm mode can be saved before the terminal is set to the non-audio alarm mode. In this way, the saved previous alarm mode can be resumed when the terminal can receive a valid wireless signal.

In the above embodiment, the wireless signal detection means has been in a continuously operating status, which will lead to a significant waste of power and not helpful to energy conservation.

For the purpose of power saving, the wireless signal detection means can be set to an intermittent operating status, that is, it detects whether a valid wireless signal can be received only when a ringing event occurs. Accordingly, the following step is included preceding the step 101 in another embodiment of the present invention:

detecting whether a ringing event occurs, and proceeding to the step 101 when the occurrence of a ringing event is detected, otherwise repeating the current step.

In other words, the wireless signal detection means stays in a non-operating status when no ringing event happens. The ringing event can be incoming call, information entry, timeout of certain timing or power alarm.

Figure 2:
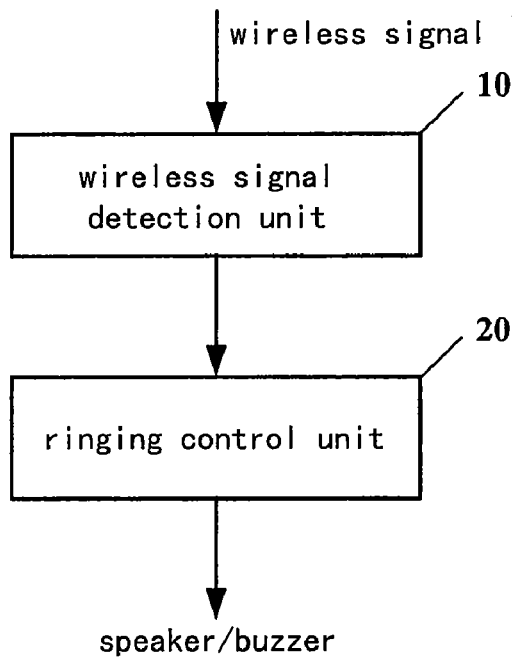
FIG. 2 is a schematic block diagram of a terminal according to an embodiment of the present invention.

Referring to FIG. 2, a terminal of the present embodiment comprises a wireless signal detection unit 10 and a ringing control unit 20. The wireless signal detection unit 10 is adapted to detect whether a valid wireless signal can be received, and send a ringing-prohibition signal to the ringing control unit 20 when it is determined that the valid wireless signal cannot be received; The ringing control unit 20 is adapted to set the terminal to a non-audio alarm mode when receiving the ringing-prohibition signal.

Further, the wireless signal detection unit 10 sends a ringing-recovery signal to the ringing control unit 20 when it is determined that a valid wireless signal can be received. The ringing control unit 20 saves the current alarm mode before the terminal is set to the non-audio alarm mode and sets the terminal to the saved alarm mode when receiving the ringing-recovery signal. The wireless signal can be RF, FM or Bluetooth signal, and the terminal can be mobile terminal, stationary telephone, computer or timer.

As described above, a wireless signal transmitting means is carried along with the user and can be an active or a passive transmitting means. The active transmitting means needs a power supply and transmits automatically a wireless signal at certain frequency, while the passive transmitting means does not require any power supply. Instead, it receives the wireless signal transmitted from the wireless signal detection unit 10 and, by use of power derived from induced current generated on the passive means by the received wireless signal, transmits a wireless signal.

If the wireless signal detection unit 10 detects that a valid wireless signal can be received, it is indicated that the user is close to the terminal, and thus the terminal can be set to the audio alarm mode by the ringing control unit 20 and ring normally upon the occurrence of any ringing event. Obviously, if the current alarm mode of the terminal is the non-audio alarm mode, the terminal can remain in the current non-audio alarm mode instead of being changed into the audio alarm mode even when the wireless signal detection unit 10 detects that a valid wireless signal can be received. On the other hand, if the user moves away from the terminal by such a distance that the wireless signal detection unit 10 detects that a valid wireless signal cannot be received, it is indicated that the user is far away from the terminal, and thus the terminal should be set to the non-audio alarm mode by the ringing control unit 20 for the alleviation of noise pollution caused by the ringing. The ringing control unit 20 can set the terminal to the non-audio alarm mode by stopping any audio signal from being sent to a speaker/buzzer. Those skilled in the art will appreciate that the terminal can be set to the non-audio alarm mode in many other ways, of which the description will not be repeated.

Figure 3:
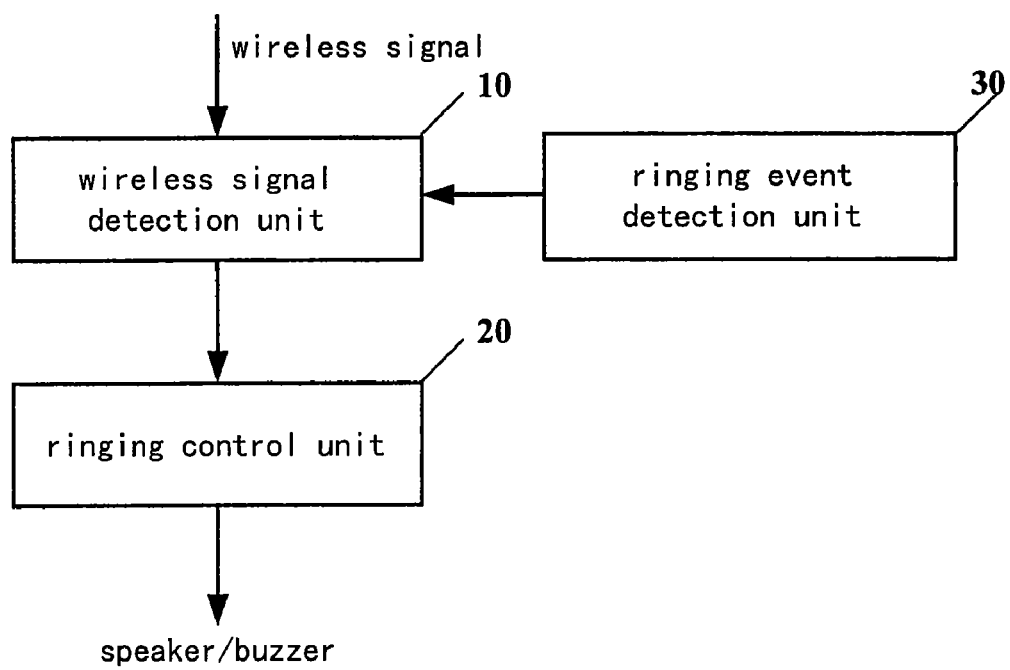
FIG. 3 is a schematic block diagram of a terminal according to another embodiment of the present invention.

In the above embodiment, the wireless signal detection unit 10 has been in a continuously operating status, which will lead to a significant waste of power and is not advantageous for energy conservation. For the purpose of power saving, the wireless signal detection unit 10 can be set to an intermittent operating status, that is, it detects whether a valid wireless signal can be received only when a ringing event occurs. Accordingly, as shown in FIG. 3, the terminal according to another embodiment of the present invention further includes a ringing event detection unit 30, which is adapted to detect whether a ringing event occurs, and enables the wireless signal detection unit 10 when the occurrence of a ringing event is detected, otherwise turns off the wireless signal detection unit 10 when no occurrence of a ringing event is detected. The ringing event can be incoming call, information entry, timeout of certain timing or power alarm.

It should be noted that the foregoing embodiments are intended to illustrate the present invention other than limiting it. Those ordinarily skilled in the art will understand that various modifications and substitutions can be made within the spirit of the present invention and should be encompassed by the scope of the present invention defined in the claims.

What is claimed is:

1. A method of controlling the audio alarm of a terminal, comprising
    detecting whether a valid wireless signal can be received, wherein said wireless signal comes from a wireless signal transmitting unit carried by a user, and it is determined that the user is far away from the terminal and cannot hear the ringing of the terminal when said valid wireless signal cannot be received; and
    setting said terminal to a non-audio alarm mode when it is determined that said valid wireless signal cannot be received;
    the method further comprising the steps of saving current alarm mode before said terminal is set to the non-audio alarm mode, and setting said terminal to a stored alarm mode when it is determined that said valid wireless signal is received.

2. The method of claim 1, further comprising, before said step of detecting whether a valid wireless signal can be received, the step of
    detecting whether a ringing event occurs, and executing said step of detecting whether a valid wireless signal can be received, when the occurrence of a ringing event is detected, if not, executing the step of detecting whether a ringing event occurs.

3. The method of claim 2, wherein
    said ringing event is an incoming call, an information entry, a timeout of a timing or a power supply alarming.

4. The method of claim 1, wherein
    said wireless signal is a RF signal, a FM signal or a Bluetooth signal.

5. The method of claim 1, wherein
    said terminal is a mobile terminal, a stationary telephone, a computer or a timer.

6. A terminal capable of controlling an audio alarm, comprising:
    a wireless signal detection unit, and
    a ringing control unit, wherein
    said wireless signal detection unit is adapted to detect whether a valid wireless signal can be received, wherein said wireless signal comes from a wireless signal transmitting unit carried by a user, and it is determined that the user is far away from the terminal and cannot hear the ringing of the terminal when said valid wireless signal cannot be received, and said wireless signal detection unit is further adapted to send a ringing-prohibition signal to said ringing control unit when it is determined that said wireless signal cannot be received; and
    said ringing control unit is adapted to set said terminal to a non-audio alarm mode when receiving said ringing-prohibition signal;
    wherein said wireless signal detection unit is further adapted to send a ringing-recovery signal to said ringing control unit when it is determined that said valid wireless signal is received; and
    said ringing control unit is further adapted to save current alarm mode before said terminal is set to the non-audio alarm mode, and set said terminal to the saved alarm mode when receiving said ringing-recovery signal.

7. The terminal of claim 6, further comprising
    a ringing event detection unit adapted to detect whether a ringing event occurs, wherein the ringing event detection unit enables said wireless signal detection unit if the occurrence of a ringing event is detected, and the ringing event detection unit turns off said wireless signal detection unit when the occurrence of a ringing event is not detected.

8. The terminal of claim 7, wherein
    said ringing event is an incoming call, an information entry, a timeout of a timing or a power alarming.

9. The terminal of claim 6, wherein said wireless signal is a RF signal, a FM signal or a Bluetooth signal.

10. The terminal of claim 6, wherein said terminal is a mobile terminal, a stationary telephone, a computer or a timer.

* * * * *